United States Patent [19]

Brown et al.

[11] Patent Number: 4,645,269

[45] Date of Patent: Feb. 24, 1987

[54] VEHICLE WHEEL COVER

[75] Inventors: Trevor J. Brown, Rochester; Gerald G. Hoganson, Ortonville, both of Mich.

[73] Assignee: General Motors Corporation, Detroit, Mich.

[21] Appl. No.: 753,438

[22] Filed: Jul. 10, 1985

[51] Int. Cl.⁴ ............................ B60B 7/02; B60B 7/06
[52] U.S. Cl. ............................ 301/37 P; 301/37 CD
[58] Field of Search ................ 301/37 R, 37 P, 37 C, 301/37 CD, 108 R, 108 A

[56] References Cited

U.S. PATENT DOCUMENTS

| | | | |
|---|---|---|---|
| 3,425,747 | 2/1969 | Alfes et al. | 301/37 R |
| 3,747,984 | 7/1973 | Andrews et al. | 301/37 P |
| 4,247,151 | 1/1981 | Brown et al. | 301/37 P X |
| 4,366,992 | 1/1983 | Enke | 301/37 P |
| 4,529,251 | 7/1985 | Schobbe | 301/37 R X |

*Primary Examiner*—David A. Scherbel
*Attorney, Agent, or Firm*—Herbert Furman

[57] ABSTRACT

A vehicle wheel cover includes a cover body of plastic material having a plurality of integral extensions, each having a relatively thin body portion adjacent the cover body and a thicker terminal portion. A stiff ring interconnects the terminal portions of the extensions and is secured thereto by clips, each of which includes retaining fingers, for retaining the cover to a vehicle wheel.

2 Claims, 4 Drawing Figures

VEHICLE WHEEL COVER

This invention relates generally to vehicle wheel covers and more particularly to vehicle wheel covers of the type including a plastic cover body and a metal retention system for releasably retaining the cover body to an annular retention flange of a vehicle wheel.

Vehicle wheel covers of this general type are known in the prior art. However, the wheel cover of this invention has several distinct features which are not found in such prior art covers.

One of the features of this invention is that the retention system includes a relatively stiff ring which interconnects and is secured to a plurality of extensions of the cover body by retention clips which include retention fingers for retaining the ring and the cover body to the wheel. The extensions have a thin body portion adjacent to the cover body and a thicker terminal portion which is secured to the ring by the retaining clips. The stiff ring and the retention fingers of the clips have a combined low spring rate so that tolerance stack conditions do not require overstressing of any of the components of the system. Another feature is that the extensions are integrally molded with the cover body. Since the body portions of the extensions are adjacent to the cover body and are thinner than the terminal portions of the extension and the cover body, the possibility of sink marks on the face of the cover body is non-existent. A further feature is that the flexible body portions permit the cover body and the stiff ring and clips of the retention system to float or shift radially relative to each other and to the wheel. The retention system and the cover body can thus move in radial planes independently and relative to each other as the body portions of the extensions flex. Yet another feature is that the retention fingers are cantilevered from body portions of the retention clips which secure the stiff ring to the terminal portions of the extensions. Yet a further feature is that the body portions of the retention clips envelop the terminal portions of the extensions and secure the stiff ring to the radially inner sides thereof.

These and other features will be readily apparent from the following specification and drawings wherein.

Figure 2:
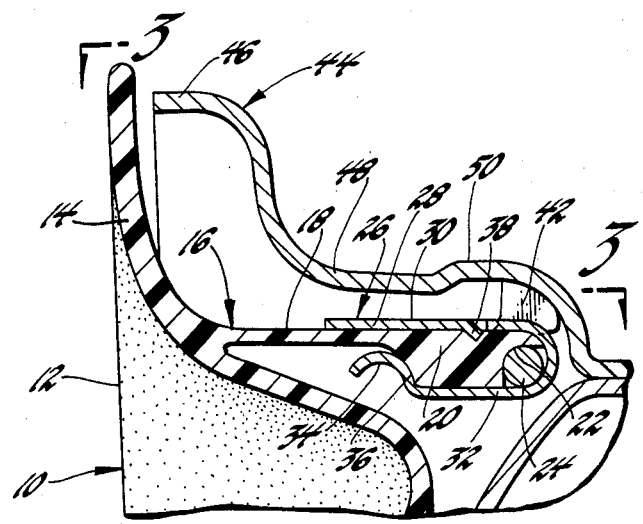
FIG. 2 is an enlarged view of the portion of FIG. 1 shown in the dash line circle.
Figure 1:
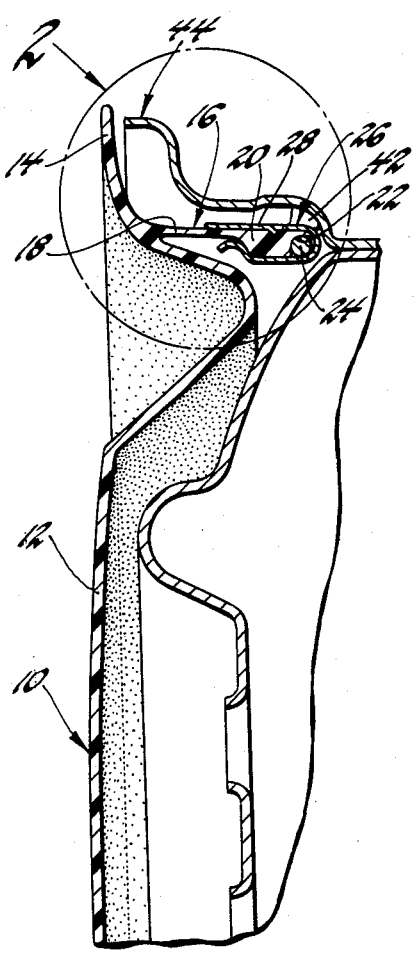
FIG. 1 is a partial sectional view of a vehicle wheel cover according to this invention mounted on a vehicle wheel.
Figure 3:
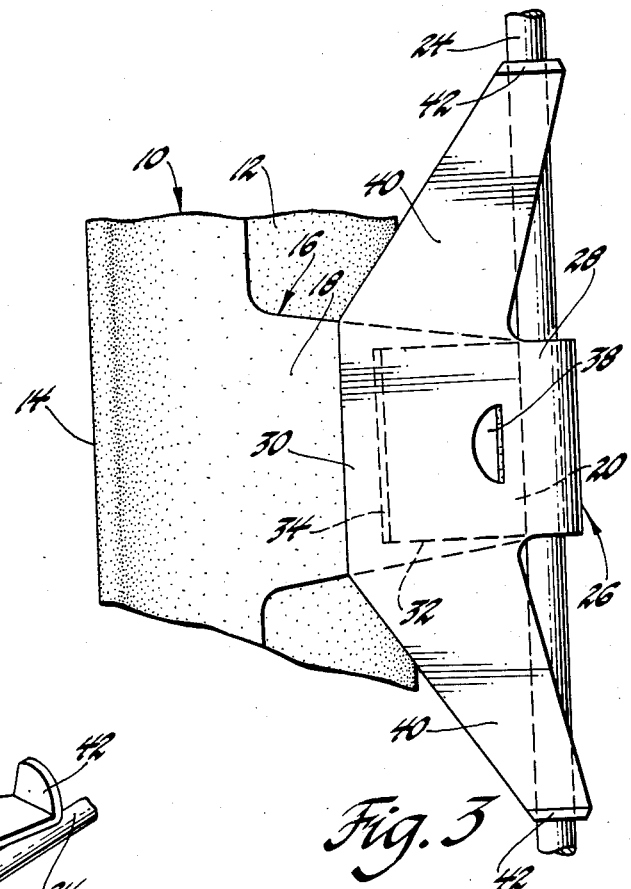
FIG. 3 is a view along line 3—3 of FIG. 2 with the cover removed from the wheel.
Figure 4:
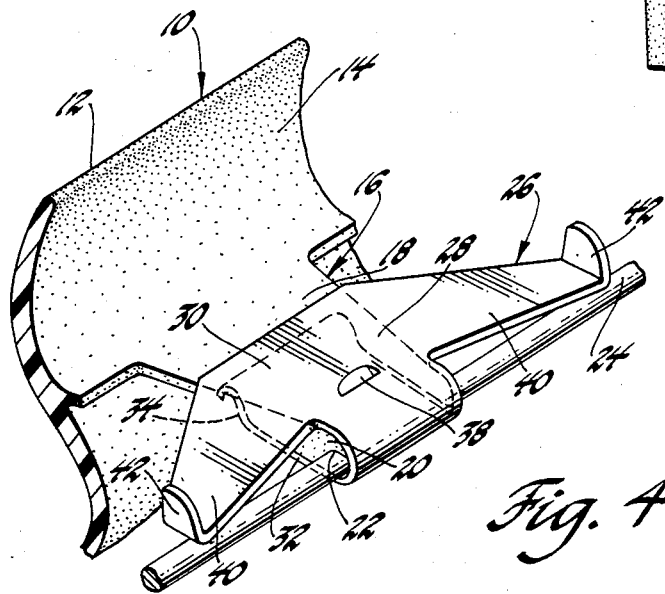
FIG. 4 is a partial perspective view of the cover removed from the wheel.

Referring now to the drawings, a vehicle wheel cover designated generally 10 according to this invention includes a cover body 12 of plastic material of predetermined thickness. Although a particular shaped cover body is shown, the shape of the cover body may be varied as desired. Further, although a unitary cover body is shown, multi-piece cover bodies may likewise be used. The cover body includes a radially outwardly extending peripheral flange 14 formed integrally with the cover body. A plurality of extensions 16, preferably spaced equally about the circumference of the cover body, extend integrally and axially inwardly from the cover body. The extensions taper axially of the cover body as can be seen in FIGS. 3 and 4. As best shown in FIG. 2, each extension 16 includes a relatively thin body portion 18 adjacent to and integral with the cover body 12 and a relatively thicker terminal portion 20. Since the body portions 18 of the extensions are thinner than the cover body and peripheral flange 14, the possibility of sink marks on the outer face of the cover body is obviated.

The terminal portions 20 of the extensions 16 are each provided with a radially inwardly opening groove 22. The grooves 22 can either be of generally right-angled cross-section as shown in FIG. 2 or can be of more circular cross-section if desired. Likewise, the grooves 22 can either be arcuate or part of a circle defined thereby, or linear and tangent to such circle. The grooves 22 receive a continuous metal ring 24 therewithin. The ring 24 is relatively stiff and inflexible and of a predetermined diameter. A clip 26 includes a generally U-shaped body portion 28 having a radially outer leg 30 and a radially inner leg 32. The outer and inner legs 30 and 32 generally envelop the terminal portion 20 and secure the ring 24 thereto within groove 22. The inner leg 32 includes a reversely bent arcuate lip 34 which bears against an arcuate juncture shoulder 36 between the body portion 18 and the terminal portion 20 to releasably retain the clip thereto. The clip further includes an integral lanced inwardly offset tang 38 which is received within a slight embossment or depression in the radially outer wall of the terminal portion 20 to additionally retain the clip thereto. An integral retention finger 40 is cantilevered from each side edge of the outer leg 30 of the clip 26 and terminates in a radially outwardly extending terminal 42. Each extension 16 is cantilevered from the cover body 12 and the fingers 40 and terminals 42 are in effect cantilevered as a unit from each of the extensions 16.

The wheel cover 10 is intended to be mounted on conventional vehicle wheel 44 which includes a terminal or lip flange 46, an annular flange 48 and an arcuate flange or tire bead seat 50. As best shown in FIGS. 2 and 4, the terminals 42 are shaped so as to generally conform to and releasably engage the radially inner side of the bead seat 50 to retain the cover to the wheel.

The ring 24 is relatively stiff as previously described and this reduces the stress to a minimum on the extensions 16 and the fingers 40 of the clips 26. The spring rate of the ring and the clips 26 is relatively low and therefore tolerance stack conditions are not a problem. Additionally, since the ring 24 is relatively stiff, the retention loads on each finger 40 and terminal 42 of the clips 26 can be easily controlled within predetermined low tolerance spring rate conditions.

As the wheel 44 rotates under actual service conditions, the deflection of the wheel is easily accommodated since the body portions 18 of the extensions 16 easily flex whenever required to adjust to changes in the design diameter of the wheel.

Thus this invention provides an improved vehicle wheel cover.

The embodiments of the invention in which an exclusive property or privilege is claimed are defined as follows:

1. A wheel cover for mounting on a vehicle wheel having a wheel opening defined in part by an axially extending radially inwardly facing annular flange comprising, a cover body of plastic material covering the opening and including a plurality of axially outwardly tapered axial extensions cantilevered from the cover body, the extensions having an axially outer relatively thin body portion and an axially inner thicker terminal portion joined to the body portion across an arcuate shoulder and provided with a radially inwardly opening groove at its terminus, a relatively stiff ring seating in the grooves of the terminal portions, clip means having a U-shaped body portion including radially inner and radially outer legs enveloping each terminal portion, the radially inner leg including an arcuate retrorse terminus engaging the arcuate shoulder between the extension portions for securing the ring and the clip thereto, the cover body as one unit and the ring and terminal portions as the other unit shifting radially relative to each other as the thin body portions of the extensions flex, and retention finger means extending oppositely of each other from the outer leg of the body portion of each clip means and engageable with the wheel flange for securing the wheel cover thereto.

2. A wheel cover for mounting on a vehicle wheel having a wheel opening defined in part by an axially extending radially inwardly facing annular flange comprising, a cover body of plastic material covering the opening and including a plurality of axial extensions cantilevered from the cover body, the extensions having an axially outer relatively thin body portion adjacent the cover body and an axially inner thicker terminal portion provided with a radially inwardly opening groove, a relatively stiff ring seating in the grooves of the terminal portions, wheel cover retention clip means having a body portion including radially inner and radially outer legs clamping the terminal portions therebetween for securing the clip means to such terminal portions and securing the ring to the terminal portions, the clip means including oppositely extending retention finger means cantilevered from the radially outer leg of the body portion of the clip means and engageable with the wheel flange for securing the wheel cover thereto, the cover body as one unit and the ring, terminal portions and clip means as the other unit shifting radially relative to each other as the relatively thin body portions of the extensions flex to thereby accommodate changes in the diameter of the wheel.

* * * * *